United States Patent
Gnanasekaran

(10) Patent No.: US 10,235,512 B2
(45) Date of Patent: Mar. 19, 2019

(54) SYSTEMS AND METHODS FOR AUTHENTICATION VIA BLUETOOTH DEVICE

(71) Applicant: PAYPAL, INC., San Jose, CA (US)

(72) Inventor: Venkatesh Gnanasekaran, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 62 days.

(21) Appl. No.: 14/313,896

(22) Filed: Jun. 24, 2014

(65) Prior Publication Data

US 2015/0371026 A1 Dec. 24, 2015

(51) Int. Cl.
| | |
|---|---|
| H04W 12/06 | (2009.01) |
| G06F 21/31 | (2013.01) |
| G06F 21/35 | (2013.01) |
| H04L 29/06 | (2006.01) |
| H04W 84/18 | (2009.01) |

(52) U.S. Cl.
CPC .......... *G06F 21/35* (2013.01); *H04L 63/0823* (2013.01); *H04L 63/0853* (2013.01); *H04W 12/06* (2013.01); *H04W 84/18* (2013.01)

(58) Field of Classification Search
CPC ..... G06F 21/35; H04L 63/0853; H04W 12/06
See application file for complete search history.

(56) References Cited

U.S. PATENT DOCUMENTS

| | | | | |
|---|---|---|---|---|
| 8,819,445 | B2* | 8/2014 | Schrecker | G06F 21/31 713/185 |
| 9,154,948 | B2* | 10/2015 | Khare | H04L 63/0492 |
| 9,210,133 | B2* | 12/2015 | Yau | H04L 63/083 |
| 9,280,765 | B2* | 3/2016 | Hammad | G06Q 20/12 |
| 9,348,990 | B2* | 5/2016 | Chuaprasert | G06Q 30/02 |
| 9,520,918 | B2* | 12/2016 | Adrangi | H04B 5/00 |
| 2003/0108009 | A1 | 6/2003 | Petersen | |
| 2003/0159050 | A1* | 8/2003 | Gantman | G06Q 20/3272 713/184 |
| 2005/0015601 | A1* | 1/2005 | Tabi | G06F 21/6227 713/182 |
| 2006/0136741 | A1* | 6/2006 | Mercredi | G06F 21/32 713/185 |
| 2008/0268776 | A1* | 10/2008 | Amendola | H04W 12/06 455/41.2 |
| 2009/0187625 | A1 | 7/2009 | Blackstock et al. | |
| 2011/0154460 | A1* | 6/2011 | Khare | H04L 63/0492 726/7 |
| 2011/0215921 | A1* | 9/2011 | Ben Ayed | G08B 1/08 340/539.11 |
| 2011/0313922 | A1 | 12/2011 | Ben Ayed | |

(Continued)

*Primary Examiner* — Linglan E Edwards
(74) *Attorney, Agent, or Firm* — Haynes and Boone, LLP

(57) ABSTRACT

A system and/or method is provided to implement authentication via Bluetooth devices. In particular, a user's Bluetooth device, such as a smart phone, may be registered to be used for automatic authentication for an online user account. When the user is attempting to log onto the online user account at a user device, such as a laptop, the user device may detect that the user's Bluetooth device is in proximity to the user device and the user may be logged into the online user account at the user device automatically. Thus, the user may be logged into the online user account seamlessly without requiring the user to input credentials, such as user name and/or password.

22 Claims, 4 Drawing Sheets

(56) References Cited

U.S. PATENT DOCUMENTS

| | | | | |
|---|---|---|---|---|
| 2012/0036364 | A1* | 2/2012 | Yoneda | H04L 9/30 |
| | | | | 713/175 |
| 2012/0322376 | A1 | 12/2012 | Couse | |
| 2013/0081119 | A1* | 3/2013 | Sampas | G06Q 20/206 |
| | | | | 726/7 |
| 2013/0165047 | A1* | 6/2013 | Suzuki | H04W 12/06 |
| | | | | 455/41.2 |
| 2013/0174252 | A1* | 7/2013 | Weber | G06F 21/6218 |
| | | | | 726/20 |
| 2013/0268767 | A1* | 10/2013 | Schrecker | G06F 21/31 |
| | | | | 713/185 |
| 2014/0222574 | A1* | 8/2014 | Emigh | H04W 4/008 |
| | | | | 705/14.58 |
| 2014/0317708 | A1* | 10/2014 | Adrangi | H04B 5/00 |
| | | | | 726/7 |
| 2015/0020180 | A1* | 1/2015 | Ngan | H04L 63/107 |
| | | | | 726/7 |
| 2015/0188891 | A1* | 7/2015 | Grange | H04L 63/06 |
| | | | | 380/270 |

* cited by examiner

SYSTEMS AND METHODS FOR AUTHENTICATION VIA BLUETOOTH DEVICE

BACKGROUND

Technical Field

The present invention generally relates to systems and methods for authentication via one or more Bluetooth devices.

Related Art

Various online websites rely on user names and passwords to authenticate users who wishes to access the respective user accounts provided by these websites. With the increasing use of electronic commerce, a user may have a plurality of different online accounts. As such, it may become difficult for the user to remember all the different combinations of user names and passwords for these different online accounts. Moreover, it may be tedious and inconvenient for the user having to enter user names and passwords every time he or she wishes to access an online account. Thus, there is a need for a system or method provides an improved process for authenticating users.

Figure 1:
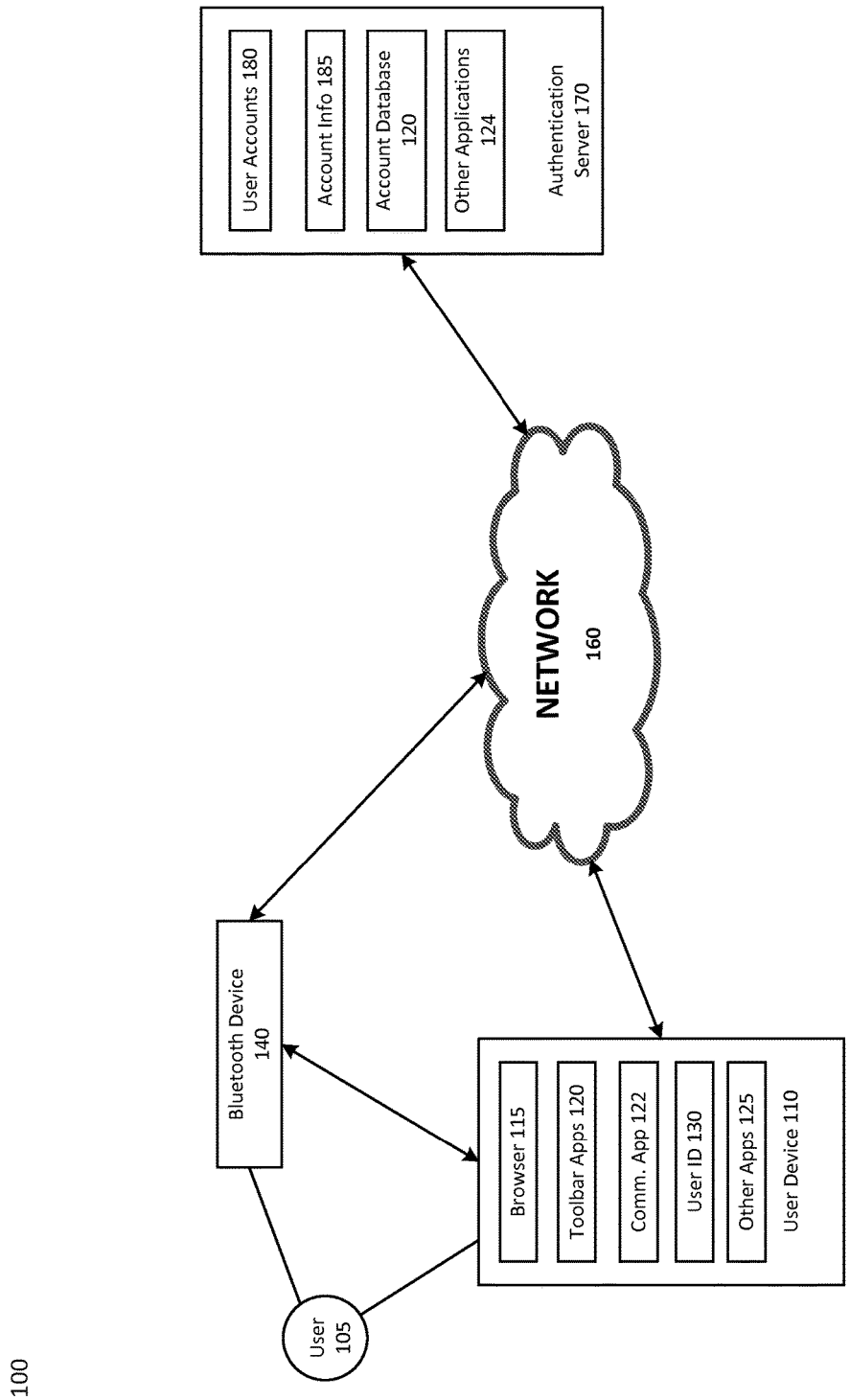
FIG. 1 is block diagram of a networked system suitable for implementing authentication via a Bluetooth device according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system and/or method may be provided to implement authentication via a Bluetooth device. In particular, a user's Bluetooth device, such as a smart phone, may be used for automatic authentication for an online user account. When the user is attempting to access the online user account at a user device, such as a laptop, the user device may detect that the user's Bluetooth device is in proximity (e.g., in communication range) to the user device and the user may be logged into the online user account on the user device automatically. Thus, the user may be logged into the online user account seamlessly without requiring the user to input credentials, such as user name and/or password.

In an embodiment, the user's Bluetooth device may first be registered at an authentication server. A set of private and public keys may be generated at the Bluetooth device. The public key may be registered and stored at the authentication server. When user authentication is required at the user device, the user device may detect whether the Bluetooth device is in proximity. A session ID issued from the authentication server may be passed from the user device to the Bluetooth device and the session ID may be encrypted at the Bluetooth device using the private key. The encrypted session ID is then sent back to the authentication server via the user device. The authentication server may decrypt the encrypted session ID with the public key. If the decrypted session ID matches the session ID initially issued by the authentication server, the user is automatically logged in at the user device without requiring the user to enter user name and/or password.

In an embodiment, a combination of different Bluetooth devices may be designated for automatic authentication. As such, when the combination of the different Bluetooth devices are in proximity to or are paired with the user device, the user may automatically be authenticated at the user device. In another embodiment, different Bluetooth devices may be designated for automatic authentication at different user accounts. For example, a first Bluetooth device or a first combination of Bluetooth devices may be designated for automatic authentication for the user's personal account while a second Bluetooth device or a second combination of Bluetooth devise may be designated for automatic authentication for the user's work account.

In an embodiment, multiple users with multiple Bluetooth devices may be associated with the same account or the same user device. As such, when more than one user is in proximity to the user device, the authentication server may determine whether to log in the users automatically based on the type of user account. For example, if multiple users are associated with one shared user account, the authentication server may allow the users associated with the account to log in automatically as long as at least one of the users are in proximity. In another example, if multiple users share the same user device, e.g., personal computer, by each have a different account at the user device, the authentication server may not automatically log in any user when more than one user is in proximity and may require one of the users to log in manually, e.g., by entering user name and password, to ensure the correct user is log into the correct user account at the user device.

In an embodiment, authentication via Bluetooth may be implemented for providing automatic authentication for other applications or transactions. For example, the user may be automatically authenticated for a payment transaction or for accessing certain applications, such as a banking application on the user's device. In another example, the authentication via a Bluetooth device may be used to log the user into a computer or a mobile device, without requiring the user to enter a PIN code. In still another example, the authentication via a Bluetooth device may be used to authenticate the user for entry into vehicles, buildings, restricted areas, public/private events, and the like. In other embodiments, Near-Field Communication (NFC), such as WiFi, Radio-Frequency Identification (RFID), or the like, also may be implemented for automatic authentication.

FIG. 1 is a block diagram of a networked system 100 configured to implement a process for authentication via a Bluetooth device in accordance with an embodiment of the invention. Networked system 100 may comprise or implement a plurality of servers and/or software components that operate to perform various payment transactions or processes. Exemplary servers may include, for example, standalone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a Bluetooth device 140, and an authentication server 170 in communication over a network 160. Authentication server 170 may be maintained by a merchant or an internet company that provides service, content, or products to consumers or users. A user 105, such as a consumer, may utilize user device 110 to access certain content or service offered at the authentication server 170. For example, user 105 may utilize user device 110 to visit a web site provided by the authentication server 170 to browse for contents or services offered at the application server 170. Although only one authentication server is shown, a plurality of authentication servers may be utilized.

User device 110, Bluetooth device 140, and authentication server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, wearable device, laptop computer, and/or other types of computing devices capable of transmitting and/or receiving data, such as an iPad™ or an iPhone™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, or make transactions.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used to associate user 105 with a particular account at the authentication server 170. A communications application 122, with associated interfaces, enables user device 110 to communicate within system 100. User device 110 may include applications for implementing Near Field Communication (NFC), such as Bluetooth communication. For example, user device 110 may include applications for pairing the user device 110 with one or more Bluetooth devices to implement Bluetooth communication.

Bluetooth device 140 may have one or more similar components as that of user device 110. In particular, Bluetooth device 140 may be a mobile device, such as a smart phone or a Bluetooth dongle, which may be carried by the user 105. As such, the presence of the Bluetooth device 140 may represent a presence of the user 105. The Bluetooth device 140 may include applications for implementing Bluetooth communication with other nearby devices. The Bluetooth device 140 may be associated with the user's account and registered at the authentication server 170.

Authentication server 170 may be maintained, for example, by a merchant or an online company which may provide content, services, or software products that may be viewed, utilized, or installed at consumer's computing devices. Authentication server 170 may store information related to user accounts 180. For example, various users may be registered at the authentication server 170 to utilize content or service provided by the authentication server 170. Authentication server 170 may store various account information 185 associated with each user account. The account information may include private information of users such as account numbers, passwords, device identifiers, user names, phone numbers, credit card information, bank information, or other financial information, Account information may also include usage history and user ratings. Authentication server 170 may include other applications 124 such as an authenticator configured to authenticate users. Authentication server 170 also may include a security application configured to encrypt/decrypt data information to provide secured communication and transfer of data.

Figure 2:
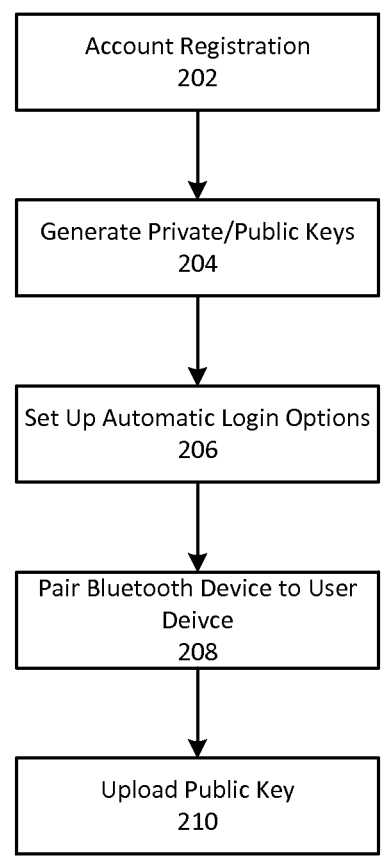
FIG. 2 is a flowchart showing a process for setting up a user account for authentication via a Bluetooth device according to one embodiment.

FIG. 2 is a flowchart showing a process for setting up a user account for authentication via Bluetooth device according to one embodiment. At step 202, a user account may be registered at the authentication server 170. For example, the user 105 may set up a user account at the authentication server 170 to receive content or services from the authentication server 170. The user 105 may first download a Bluetooth authentication application from the authentication server 170 to the Bluetooth device 140. The Bluetooth authentication application may be configured to implement authentication via Bluetooth. The application also may implement content or services from the authentication server 170. During registration, the user 105 may provide various personal information to the authentication serve 170, such as user name, password, address, contact information, account settings user preferences, and the like. The user 105 also may indicate whether the user wishes to utilize authentication via Bluetooth in user preferences.

At step 204, the Bluetooth device 140 may generate a unique set of public and private keys for encryption. The encryption may facilitate secured communication to and from the Bluetooth device 140. The public/private key set may be a type of asymmetric cryptography. The private key and the public key may be associated mathematically. The private key may be used to encrypt data for secured data communication. The public key may be given to other devices that receive the encrypted data to decrypt the encrypted data. In an embodiment, the private/public key set may be generated at the Bluetooth device 140, such that the private key is kept at the Bluetooth device 140 and the public key is forwarded to the authentication server 170. In another embodiment, the private/public key set may be generated at the authentication server 170, such that the private key is kept at the authentication server 170 and the public key is forwarded to the Bluetooth device 140. In an embodiment, a unique set of private/public keys may be generated for each account or device on which the user 105 is to be authenticated.

At step 206, the user 105 may first log into the user account at the authentication server 170 to set up the automatic login options. The user 105 may selectively turn on or off the automatic login option. The user 105 also may designate one or more Bluetooth devices that may trigger the automatic login. Further, the user 105 may designate devices, websites, accounts, or other settings for using automatic login via Bluetooth. For example, the user 105 may designate an account at the authentication server 170 that is to be automatically logged in using the Bluetooth device 140. The Bluetooth device 140 or the device ID of the Bluetooth device 140 may be associated with this account. Thus, the authentication server 170 may determine which account is to be logged in automatically when the Bluetooth device 140 is in proximity.

In some embodiments, multiple Bluetooth devices may be associated with one account for automatic authentication. For example, when any one of the designated Bluetooth devices is present, the account may automatically be logged in. In another example, the account may automatically be logged in when all of the designated Bluetooth devices are present. In still another example, the account may automatically be logged in when only one of the designated Bluetooth devices is present. In an embodiment, a certain combination of Bluetooth devices in proximity may trigger automatic login for a certain account. For example, when the user 105's smart phone and smart watch are present, a personal email account may automatically be logged in at the user device 110. In another example, when the user 105's smart phone and work laptop are present, a work email account may automatically be logged in. Thus, the user may set up different combinations of Bluetooth devices for automatic login of different accounts or devices.

At step 208, the Bluetooth device 140 may be paired with the user device 110 via Bluetooth communication. In an embodiment, the Bluetooth device 140 may subsequently be automatically paired with the user device 110 when the Bluetooth device 140 is in proximity to the user device 110. At step 210, the public key generated for the account or the device may be forwarded from the Bluetooth device 140 to the authentication server 170. The authentication server 170 may store and associate the public key with the Bluetooth device that generated the public key.

By the process 200, automatic authentication may be set up for an account at the authentication server 170. In particular, a unique set of private/public keys may be generated for secured communication for authenticating the user 105. The user 105 also is allowed to designate one or more Bluetooth devices that may trigger the automatic authentication of the account. Further, the user is allowed to set how the automatic authentication is triggered.

Figure 3:
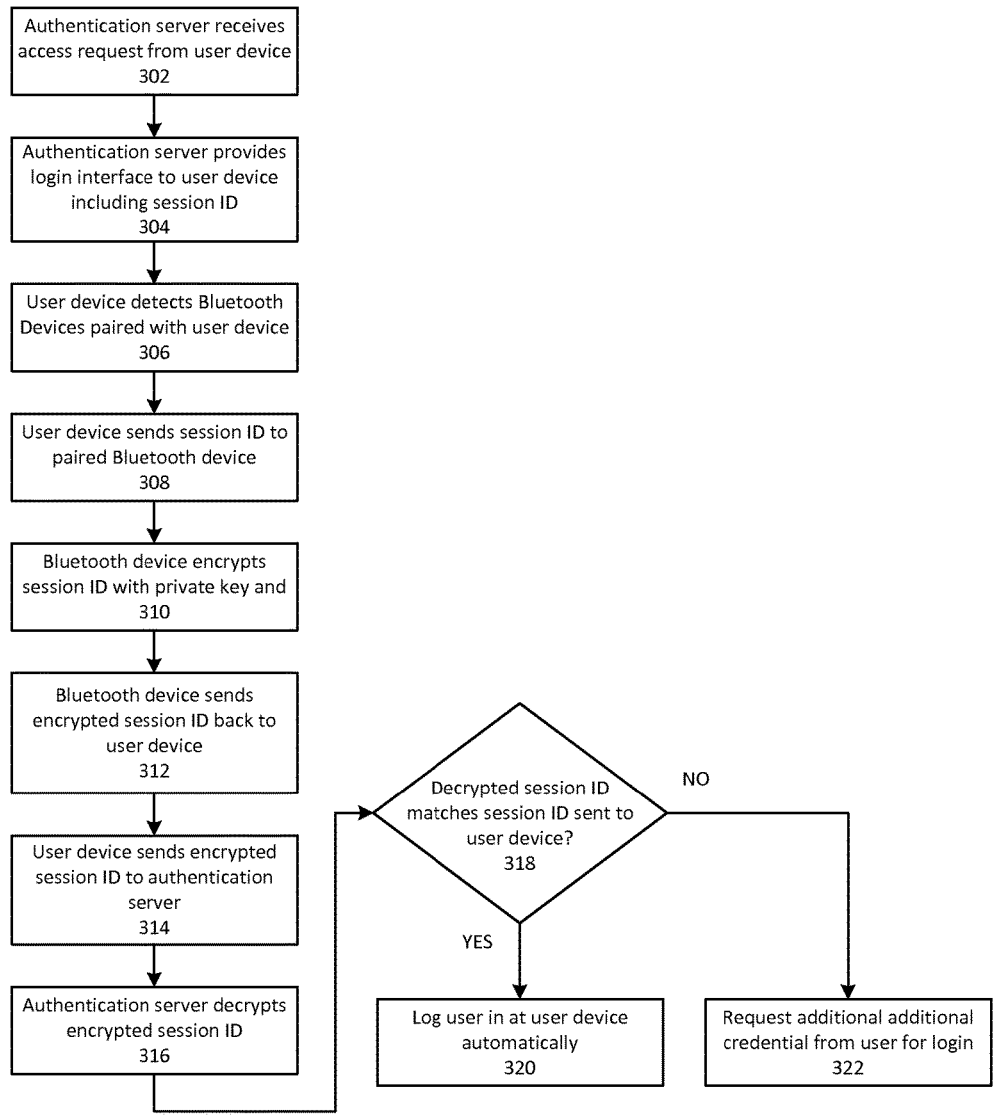
FIG. 3 is a flowchart showing a process for authentication via a Bluetooth device according to one embodiment.

FIG. 3 is a flowchart showing a process for authentication via Bluetooth device according to one embodiment. At step 302, the authentication server 170 may receive a request to access an account at the authentication server 170. For example, the user 105 may use a browser at the user device 110 to visit a website that allows the user 105 to log into the user 105's account at the authentication server 170. At step 304, the authentication server 170 may provide an interface for the user 105 to log in. For example, the authentication server 170 may send a webpage to the user device 110 that includes fields for the user 105 to enter credentials, such as user name and/or password, for authentication.

The authentication server 170 may generate a session ID which is forwarded to the user at the user device 110 along with the login interface. The session ID may be unique to the login session and may identify the particular session the user is about to log in. A new session ID may be generated and used for each time the user 105 accesses the user's account. As such, the authentication server 170 may be able to keep track of the different sessions of account accesses. The session ID may have an expiration time, such as 5 minutes or 10 minutes. When the session ID has expired, the account access may end and the user 105 may automatically be logged out of the account. In an embodiment, the authentication server 170 may keep the session ID alive when the user 105 continues to access the account, e.g., continuing user activities in the account. As such, the session ID may expire or the account access may time out when the user 105 is inactive for a predetermined amount of time.

At step 306, the user device 110 may detect or determine Bluetooth devices paired with the user device 110. In an embodiment, the authentication interface sent from the authentication server 170 may include instructions for the user device 110 to search for Bluetooth devices configured for automatic authentication. For example, the login webpage may include programming code, such as Javascript, that triggers the user device 110 to search for the Bluetooth device 140. In particular, the user device 110 may be paired with one or more Bluetooth devices. The user device 110 may search for a paired Bluetooth device that has a Bluetooth service ID designated for authentication. For example, the Bluetooth device 140 may be paired with the user device 110 having a Bluetooth service ID designated for automatic authentication while other Bluetooth devices paired with the user device 110 may have other service IDs for other functions, such as audio output, mouse input, and the like. As such, the user device 110 may determine whether any Bluetooth devices with the authentication service ID is currently paired with the user device 110.

At step 308, if there is one or more Bluetooth devices with the authentication service ID paired with the user device 110, the user device 110 may forward the session ID issued from the authentication server 170 to the Bluetooth device 140, which is paired with the user device for the purpose of automatic authentication. In some embodiments, more than one Bluetooth devices may be paired with the user device 110 for automatic authentication. In this case, the user device 110 may send the session ID to each of the paired Bluetooth devices that are designated for automatic authentication. In some embodiments, the user may be automatically authenticated when a first Bluetooth device is paired with the user device and a second Bluetooth device is not paired with the user device. At step 310, the Bluetooth device 140 may receive the session ID and may encrypt the session ID with the private key previously created for automatic authentication. In some embodiments, multiple Bluetooth devices may receive the session ID. In this case, each of the multiple Bluetooth devices may encrypt the session ID with each of the Bluetooth devices' own unique private key.

At step 312, the Bluetooth device 140 or the multiple Bluetooth devices may send the encrypted session ID back to the user device 110. In an embodiment, the encrypted session ID may be included with a Bluetooth device ID of the Bluetooth device that encrypted the session ID. As such, in the case that the session ID is encrypted by multiple Bluetooth devices, it may be determined which encrypted session ID is encrypted by which Bluetooth device. At step 314, the user device 110 may send the encrypted session ID to the authentication server 170.

At step 316, the authentication server 170 may receive the encrypted session ID from the user device 110 and may decrypt the encrypted session ID. In particular, the authentication server 170 may determine the public key for decrypting the session ID based on the device ID of the user device 110 or the device ID of the Bluetooth device included with the encrypted session ID. For example, based on the device ID of the user device 110, the authentication server 170 may determine the user account that is associated with the user device 110. The user account may indicate one or more Bluetooth devices and their respective public keys for decrypting the encrypted session ID. In an embodiment, the device ID of the Bluetooth device may be used to find the public key associated with the Bluetooth device that encrypted the session ID. After identifying the public key, the authentication server 170 may decrypt the encrypted session ID using the identified public key.

At step 318, the authentication server 170 may match the decrypted session ID with the session ID, which was originally issued from the authentication server 170. If the decrypted session ID matches the originally issued session ID, the authentication server 170 may automatically authenticate or log in the user 105 at the user device 110 at step 320. As such, the user 105 may access the user account without having to enter credentials, such as user name and/or password. On the other hand, if the decrypted session ID does not match the originally issued session ID or if no encrypted session ID is received from the user device 110, the authentication server 170 may require the user to enter credentials at the user device 110 to gain access to the user account at step 322.

In some embodiments, the user 105 may set up various requirements for automatic authentication. For example, automatic authentication may require the presence of a specific combination of Bluetooth devices. The user 105 may be automatically authenticated at the user device 110 when the user 105's smart phone and the user 105's smart watch are both in proximity and paired with the user device 110. In this case, the session ID issued from the authentication server 170 may be encrypted by both the user 105's smart phone and smart watch using their respective private keys. The authentication server 170 may receive two encrypted session IDs, one encrypted by the smart phone and one encrypted by the smart watch. The authentication server 170 may decrypt these two encrypted session IDs respectively using the smart phone's public key and the smart watch's public key. When both of the decrypted session ID's match the originally issued session ID, the authentication server 170 may allow automatic authentication at the user device 110.

In an embodiment, different combination of Bluetooth devices may trigger automatic authentication for different user accounts. For example, when the user's smart watch and smart phone are present at the user device 110, the authentication server 170 may automatically log the user 105 into the user 105's personal email account. When the user's work phone and smart watch are present at the user device 110, the authentication server 170 may automatically log the user 105 into the user 105's work email account. As such, the user 105 may designate different combinations of Bluetooth devices for automatic authentication of different accounts.

In an embodiment, based on the type of account, the authentication server 170 may determine whether to implement automatic authentication when more than one Bluetooth devices are present at the user device 110. For example, an account may be shared by multiple users. When one or more of the Bluetooth devices associated with the multiple users of the shared account are present at the user device 110, the authentication server 170 may implement automatic authentication regardless of which of the multiple users is present. In another example, a computer may be shared by multiple users each with his/her own unique user account. As such, when multiple users are detected at the computer, the authentication server 170 may not implement automatic authentication, such that an account is not accessed by a wrong user.

In an embodiment, the Bluetooth signal strength from different Bluetooth devices may be used to determine which Bluetooth device or which user is located closest to the user device 110. As such, the correct user account may be determined for the correct user based on how close the users are to the user device 110. For example, the account of the user located closest to the user device 110 may automatically be authenticated assuming the user located closest to the user device 110 is at the user device 110 attempting to access the user account.

In an embodiment, the user 105 may be allowed to set a distance range within which the automatic authentication is to be implemented. For example, the user 105 may want to be automatically authenticated only when the user 105 is located directly at the user device 110. As such, the automatic authentication may be implemented when the Bluetooth signals received from the user 105's Bluetooth device 140 is very strong. When the Bluetooth signals received from the user 105's Bluetooth device 140 is weak, the user 105 may not be automatically authenticated. This may ensure that the user 105's account is not accessed by others when the user 105 is not directly located at the user device 110. In an embodiment, certain locations may be designated for automatic login, such as the user's home or the user's work place. For example, the user device 110 or the Bluetooth device 140 may include a Global Positioning System (GPS) device or other location sensor. When the user device 110 or the Bluetooth device 140 is within a designated location, based on the location detected by the GPS device, the user device 110 or the Bluetooth device 140 may implement automatic login. As such, the user 105 may designate certain familiar locations where the user 105 may be automatically log into an account or a device.

The above processes 200 and 300 for automatic authentication via Bluetooth devices may allow the user 105 to quickly and conveniently log in or gain access to an account at the user device 110 when one or more of the user 105's Bluetooth devices are in proximity to and paired with the user device 110. Thus, the user 105 may be automatically log into the user's account without having to enter credentials, such as user name and/or password. In particular, the automatic authentication process may utilize the encryption and decryption of a session ID between the Bluetooth device 140 and the authentication server 170 to authenticate the user 105 automatically.

The automatic authentication via Bluetooth process may be implemented for access to other applications or devices besides user accounts at the user device 110. In an embodiment, the process may be implemented for automatically logging the user into a device, such as a computer. For example, a computer, such as a laptop, a desktop, a mobile device, or the like may require a user name and/or a password or a PIN to gain access to the device. The user 105 may register the device at the authentication server 170 to use automatic authentication via a Bluetooth device. The user 105 may designate one or more Bluetooth devices, the presence of which may trigger automatic authentication for access to the device. When the designated Bluetooth device is in proximity and be paired with the device, the authentication server 170 may automatically authenticate and allow the user to access the device without entering credentials, such as password and/or user name. As such, various devices, such as smart phones, wearable devices, various computing devices, and the like, may be unlocked using the automatic authentication via Bluetooth.

In an embodiment, the authentication via a Bluetooth process may be implemented for unlocking a vehicle. For example, a vehicle, such as a car, a boat, a bike, or any transportation vehicle, may require a key to gain access or start the vehicle. The user 105 may register the vehicle at the authentication server 170 to use automatic authentication via a Bluetooth device. The user 105 may designate one or more Bluetooth devices, the presence of which may trigger automatic authentication for access to the vehicle. The vehicle may include a communication device configured to communicate and be paired with the Bluetooth device. The communication device of the vehicle also may communicate with the authentication server 170 via the network 160. When the designated Bluetooth device is in proximity and paired with the vehicle, the authentication server 170 may automatically authenticate and allow the user to access or start the vehicle without requiring a key. As such, various vehicles may be unlocked or accessed using the automatic authentication via Bluetooth.

In an embodiment, the authentication via Bluetooth process may be implemented for gaining entry into a building or unlocking a door or a gate. For example, an access point, such as a door to a house, a door to an office building, a gate to an area, or other physical access point may require a user to provide a key or certain credentials, such as passcode, to gain access or unlock. The user 105 may register the access point at the authentication server 170 to use automatic authentication via a Bluetooth device. The user 105 may designate one or more Bluetooth devices the presence of which may trigger automatic authentication for access through the access point. The access point may be equipped with a communication device configured to communicate and be paired with the Bluetooth device. The communication device of the access point also may communicate with the authentication server 170 via the network 160. When the designated Bluetooth device is in proximity and paired with the device, the authentication server 170 automatically authenticate and allow the user to access the access point without keys or credentials, such as password and/or user name. As such, various access points, such as doors or gates, may be unlocked using the automatic authentication via Bluetooth.

Figure 4:
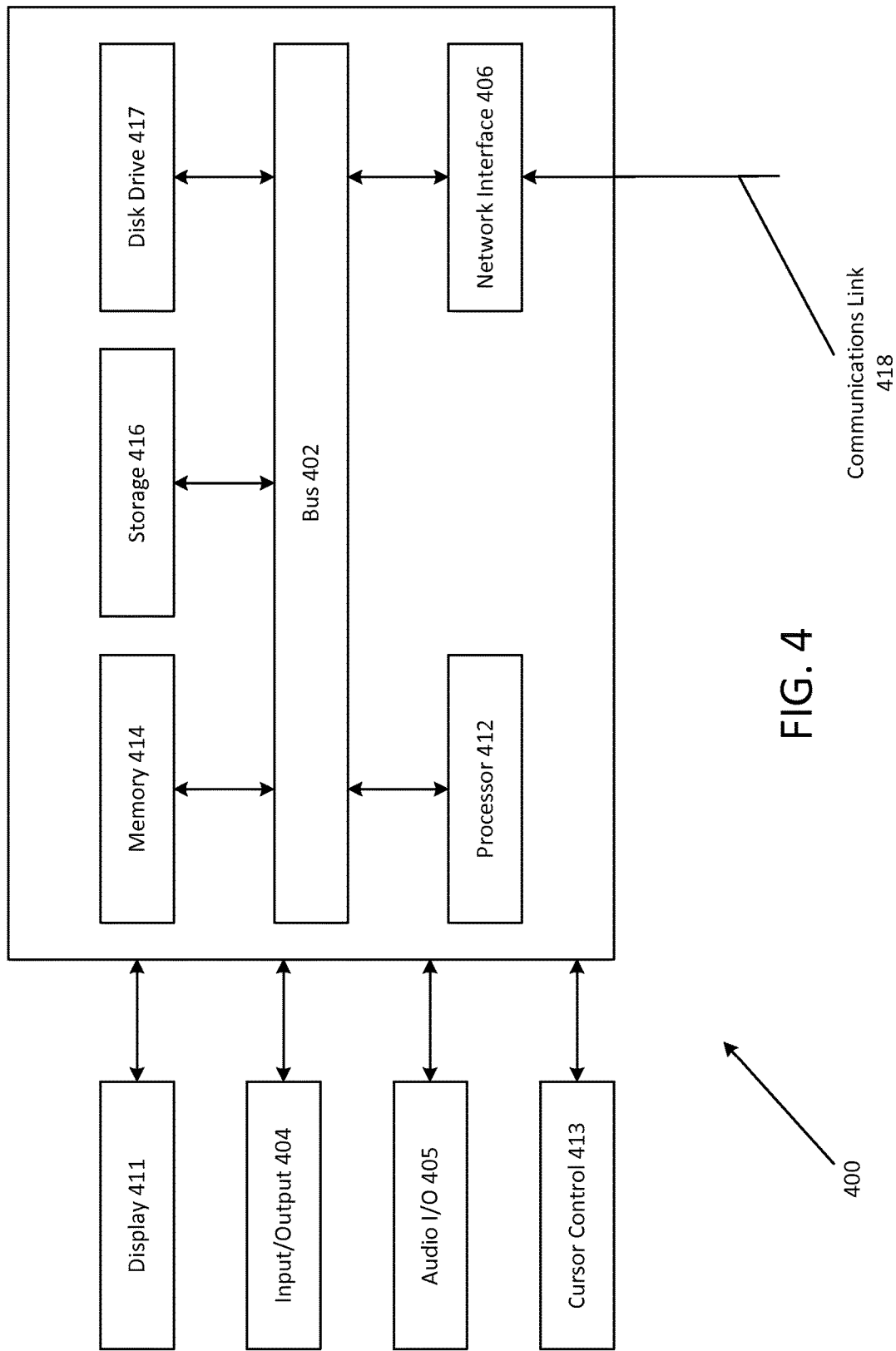
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
    a non-transitory memory; and
    one or more hardware processors coupled to the non-transitory memory and configured to execute instructions to cause the system to perform operations comprising:
        receiving, from a first user device associated with a user, an authentication request;
        in response to receiving the authentication request, determining that a first plurality of short-range communication devices associated with the user are located within a predefined proximity to the first user device and each of the first plurality of short-range communication devices has been paired with the first user device;
        obtaining a respective device identifier associated with each of the first plurality of short-range communication devices;
        determining that each of the respective device identifiers has been pre-registered;
        in response to the determining that each of the respective device identifiers has been pre-registered, authenticating each of the first plurality of short-range communication devices based on the respective device identifiers;
        determining, based on which combination of the first plurality of short-range communication devices are authenticated, a corresponding user account of the user; and
        in response to authenticating each of the first plurality of short-range communication devices and determining the corresponding user account of the user, authenticating the user on the first user device for access to the corresponding user account of the user automatically without entry of credentials of the corresponding user account of the user by the user or by any of the first plurality of short-range communication devices.

2. The system of claim 1, wherein the operations further comprise:
    in response to receiving the authentication request, presenting an authentication interface, which is configured to receive authentication credentials of the corresponding user account of the user, to the user on the first user device.

3. The system of claim 2, wherein the authentication interface includes instructions for the first user device to detect whether each of the first plurality of short-range communication devices associated with the user is paired with the first user device.

4. The system of claim 2, wherein the operations further comprise:
    obtaining a public key generated by one of the first plurality of short-range communication devices;
    generating a session ID to be associated the authentication request;
    sending the session ID to the first user device;
    receiving an encrypted session ID encrypted with a private key at the one of the first plurality of short-range communication devices;
    decrypting the encrypted session ID with the public key obtained from the one of the first plurality of short-range communication devices; and
    matching the decrypted session ID with the session ID sent to the first user device;
    wherein the authenticating the user on the first user device is based on whether the decrypted session ID matches the session ID sent to the first user device.

5. The system of claim 4, wherein the authenticating the user is done automatically without requiring the user to enter credentials for the corresponding user account when the decrypted session ID matches the session ID sent to the first user device.

6. The system of claim 4, wherein the operations further comprise requiring the user to enter credentials for authentication on the first user device when the decrypted session ID does not match the session ID sent to the first user device.

7. The system of claim 4, wherein the session ID is unique to an access session based from the authentication request.

8. The system of claim 7, wherein the access session expires after the user is inactive at the corresponding user account for a predetermined amount of time.

9. The system of claim 4, wherein the encrypted session ID includes the respective device identifier associated with the one of the first plurality of short-range communication devices, and wherein the public key for decrypting the encrypted session ID is selected based on the respective device identifier associated with the one of the first plurality of short-range communication devices.

10. The system of claim 1, wherein the respective device identifier associated with one of the first plurality of short-range communication devices includes a service ID designated for authentication.

11. The system of claim 1, wherein the operations further comprise:
  authenticating one of the first plurality of short-range communication devices based at least in part on a registration of the respective device identifier by the user with the corresponding user account;
  storing a private key associated with the corresponding user account on the one of the first plurality of short-range communication devices; and
  storing a public key associated with the corresponding user account on the system, wherein the public key is capable of decrypting data encrypted using the private key;
  wherein a successful decryption of data encrypted using the private key causes the system to grant the user access to the corresponding user account on the first user device.

12. The system of claim 1, wherein one of the first plurality of short-range communication devices includes a Bluetooth device.

13. A method comprising:
  receiving, from a first user device, an authentication request;
  in response to receiving the authentication request, determining, by a hardware processor, that a first plurality of short-range communication devices associated with a user are located within a predefined proximity to the first user device and each of the first plurality of short-range communication devices has been paired with the first user device;
  obtaining a respective device identifier associated with each of the first plurality of short-range communication devices;
  determining that each of the respective device identifiers has been pre-registered;
  in response to the determining that each of the respective device identifiers has been pre-registered, authenticating each of the first plurality of short-range communication devices based on the respective device identifiers;
  determining, based on which combination of the first plurality of short-range communication devices are authenticated, a corresponding user account of the user; and
  in response to authenticating each of the first plurality of short-range communication devices and determining the corresponding user account of the user, authenticating the user on the first user device for access to the corresponding user account of the user automatically without entry of credentials of the corresponding user account of the user by the user or by any of the first plurality of short-range communication devices.

14. The method of claim 13,
  wherein different combinations of authenticated short-range communication devices are used to authenticate access to different user accounts of the user.

15. The method of claim 13, further comprising:
  in response to receiving the authentication request, presenting an authentication interface, which is configured to receive authentication credentials of the corresponding user account of the user, to the user on the first user device.

16. The method of claim 15, wherein the authentication interface includes instructions for the first user device to detect whether each of the first plurality of short-range communication devices is paired with the first user device.

17. The method of claim 15, further comprising:
  obtaining a public key generated by a second short-range communication device of the first plurality of short-range communication devices;
  generating a session ID to be associated the authentication request;
  sending the session ID to the first user device;
  receiving an encrypted session ID encrypted with a private key at the second short-range communication device;
  decrypting the encrypted session ID with the public key obtained from the second short-range communication device; and
  matching the decrypted session ID with the session ID sent to the first user device;
  wherein the authenticating the user on the first user device is based on whether the decrypted session ID matches the session ID sent to the first user device.

18. The method of claim 17, further comprising authenticating the user automatically without requiring the user to enter credentials for the corresponding user account when the decrypted session ID matches the session ID sent to the first user device.

19. A non-transitory machine-readable medium having stored thereon machine-readable instructions executable to cause a machine to perform operations comprising:
  receiving, from a first user device, an authentication request;
  in response to receiving the authentication request, determining that a first plurality of short-range communication devices associated with a user are located within a predefined proximity to the first user device and each of the first plurality of short-range communication devices has been paired with the first user device;
  obtaining a respective device identifier associated with each of the first plurality of short-range communication devices;
  determining that each of the respective device identifiers has been pre-registered;
  in response to the determining that each of the respective device identifiers has been pre-registered, authenticating each of the first plurality of short-range communication devices based on the respective device identifiers;
  determining, based on which combination of the first plurality of short-range communication devices are authenticated, a corresponding user account of the user; and
  in response to authenticating each of the first plurality of short-range communication devices and determining the corresponding user account of the user, authenticating the user on the first user device for access to the corresponding user account of the user automatically without entry of credentials of the corresponding user account of the user by the user or by any of the first plurality of short-range communication devices.

20. The non-transitory machine-readable medium of claim 19, wherein the first user device is a vehicle, and wherein authenticating the user on the first user device comprises unlocking the vehicle.

21. The non-transitory machine-readable medium of claim 19, wherein the first user device is a computing device, and wherein authenticating the user on the first user device comprises unlocking the computing device.

22. The non-transitory machine-readable medium of claim 19, wherein the first user device is a locking device preventing a physical access to a structure, and wherein authenticating the user on the first user device comprises unlocking the locking device.

\* \* \* \* \*